United States Patent [19]

Bender

[11] Patent Number: 4,998,679
[45] Date of Patent: Mar. 12, 1991

[54] DEVICE FOR CHOPPING STRAW

[76] Inventor: Arne Bender, Assarsgården, Larv, S-535 00 Kvänum, Sweden

[21] Appl. No.: 264,319

[22] Filed: Oct. 28, 1988

Related U.S. Application Data

[63] Continuation-in-part of Ser. No. 71,793, Jun. 10, 1987, abandoned.

[30] Foreign Application Priority Data

Sep. 30, 1985 [SE] Sweden .............................. 8504508

[51] Int. Cl.$^5$ ............................................. B02C 18/18
[52] U.S. Cl. .................................. 241/243; 241/292.1
[58] Field of Search ................... 241/190, 194, 189 R, 241/101.7, 101 A, 195, 243, 186.4, 57, 292.1

[56] References Cited

U.S. PATENT DOCUMENTS 3,380,502  4/1968  Gronberg .
3,874,604  4/1975  Gronberg et al. .
4,403,743  9/1983  Ducasse .

FOREIGN PATENT DOCUMENTS 471587   10/1971  Australia .
2801827   4/1983  Fed. Rep. of Germany .
1055469   2/1954  France .
1141447   9/1957  France .
368657   7/1974  Sweden .
1060179   3/1967  United Kingdom .
2116834  10/1983  United Kingdom .

Primary Examiner—Mark Rosenbaum
Attorney, Agent, or Firm—Cushman, Darby & Cushman

[57] ABSTRACT

A device for chopping straw of the type which comprises a rotor arranged in an apparatus housing, said rotor having a plurality of knife arms detachably attached thereto and which when rotated pass between a number of counter-knives attached to a knife beam. The knife arms and counter-knives comprises flat bars provided with at least one sharpened edge on one of its long sides. The knife arms are arranged to act as fan blades guiding the air stream with chopped straw exiting from the apparatus housing, by the fact that each knife arm has said at least one edge bevelled in a respective oblique sharpening plane extending substantially throughout the thickness of respective knife arm. A desired spreading direction and spreading width of the chopped straw is obtained by arranging the detachable knife arms with their sharpening planes in different configurations with respect to each other.

5 Claims, 5 Drawing Sheets

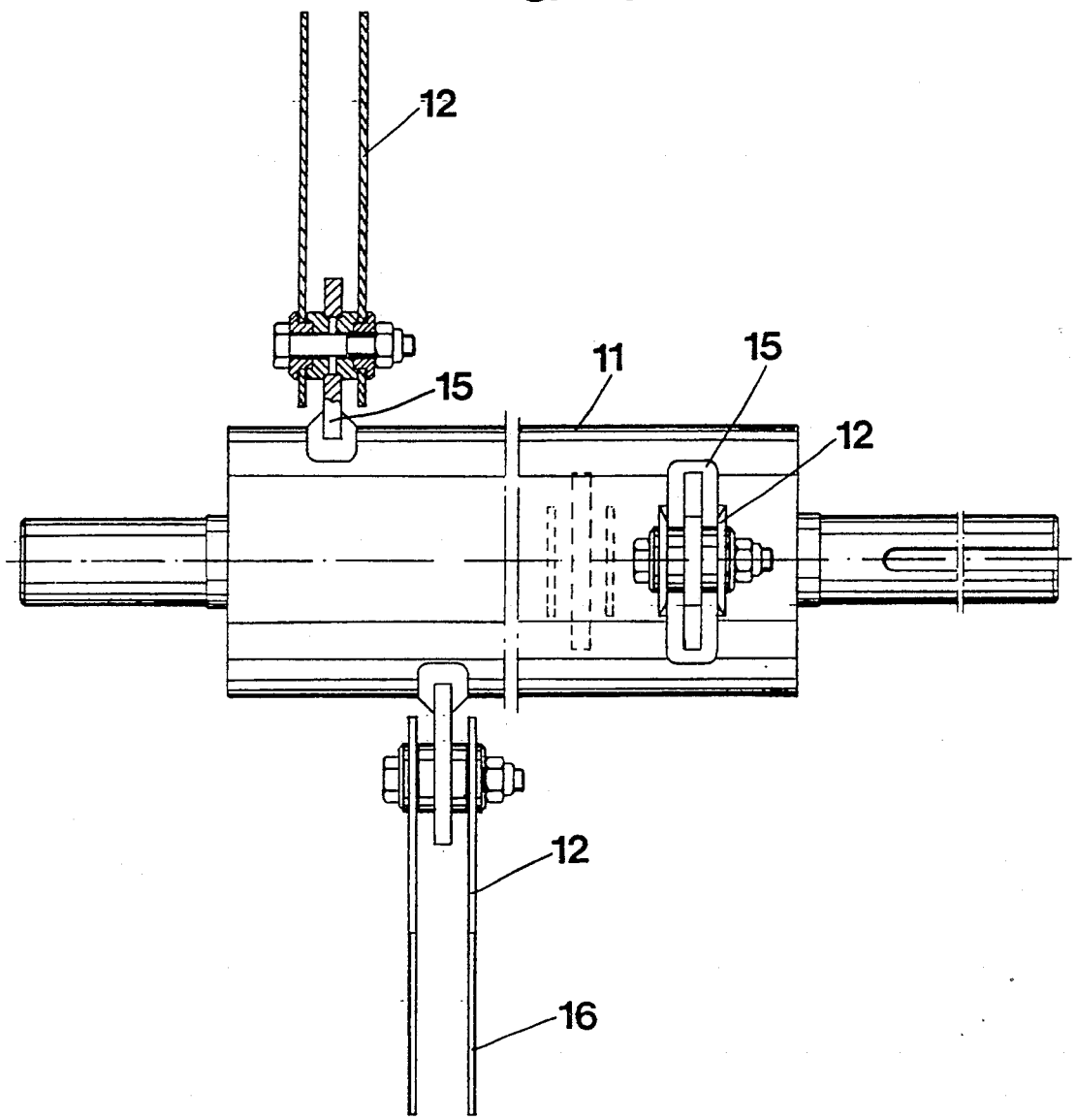

DEVICE FOR CHOPPING STRAW

This application is a continuation-in-part of Ser. No. 07/071,793, Jun. 10, 1987, now abandoned.

BACKGROUND OF THE INVENTION

The present invention refers to a device for chopping straw of the type which comprises a rotor arranged in an apparatus housing, said rotor having knife arms projecting radially therefrom, which when rotated pass between a number of counter-knives, located in a row and attached to a knife beam, the knife arms and counter-knives being produced of flat bars provided with at least one sharpened edge on one of its long sides.

The Swedish patent publication no. 403.552 (corresponding to German patent no. 2.801.827) describes a device of the above mentioned type, where every knife arm presents a double cutting surface along both long sides. A knife which has been damaged on the cutting edge can thereby be used again by turning the other edge-provided side to an active position. The production cost for a knife of this type is relatively high due to the number of sharpening steps needed.

Tests have been carried out to improve the cutting result of the straw chopper by arranging the knives closer to each other. This has not given the desired effect but has instead resulted in an increased power consumption.

SUMMARY OF THE INVENTION

The object of the invention is to provide a device of the above mentioned type, which presents an improved cutting result and a more effective spreading of the chopped straw behind the straw cutter in comparison with previous devices and which also simplifies and cheapens the production. This has been accomplished by the fact that said knife arms are arranged to act as fan blades guiding the air with chopped straw exiting from said chopped straw outlet, thereby that each said knife arm having said leading edge thereof in said radially outer portion thereof bevelled in a respective oblique sharpening plane which extends substantially throughout the thickness of the respective knife arm; at which the detachable knife arms may be arranged with their sharpening planes in different configurations with respect to each other in order to provide a desired spreading direction and spreading width of the chopped straw behind said outlet.

BRIEF DESCRIPTION OF THE DRAWINGS

The invention will now be closer described with reference to the drawings, which show some embodiments.

FIG. 3 shows on a larger scale an axial section through the knife-equipped rotor.

DETAILED DESCRIPTION OF PREFERRED EMBODIMENTS

Figure 1:
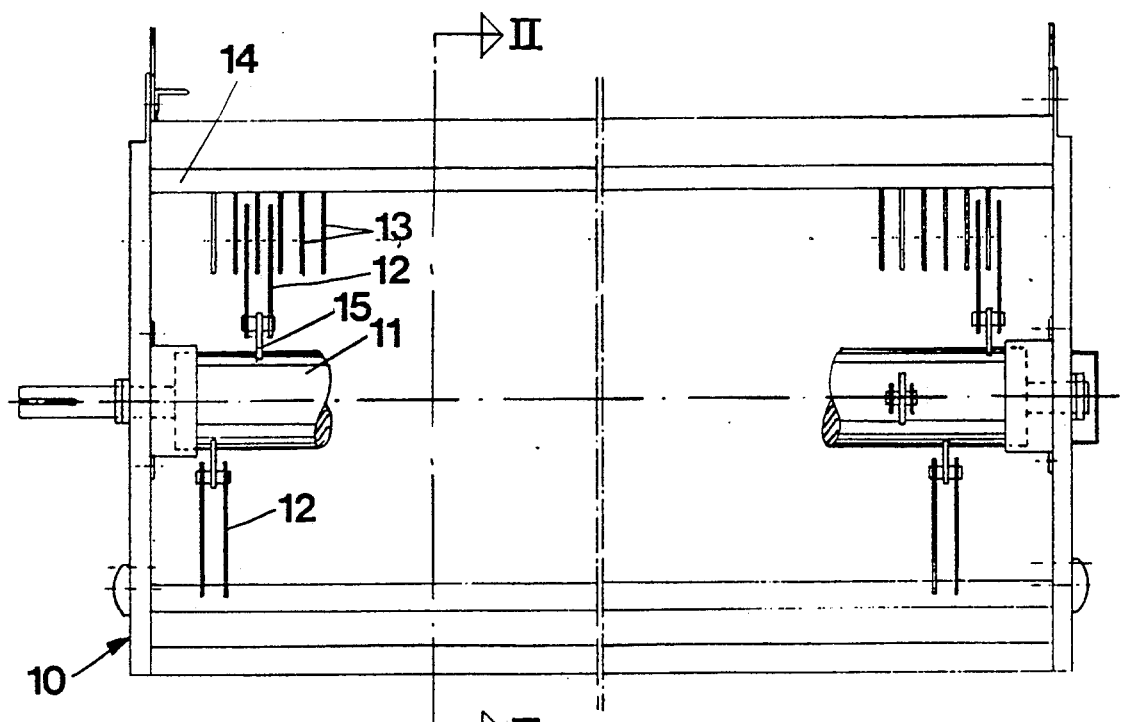
FIG. 1 is an axial section through an embodiment of the device according to the invention.
Figure 2:
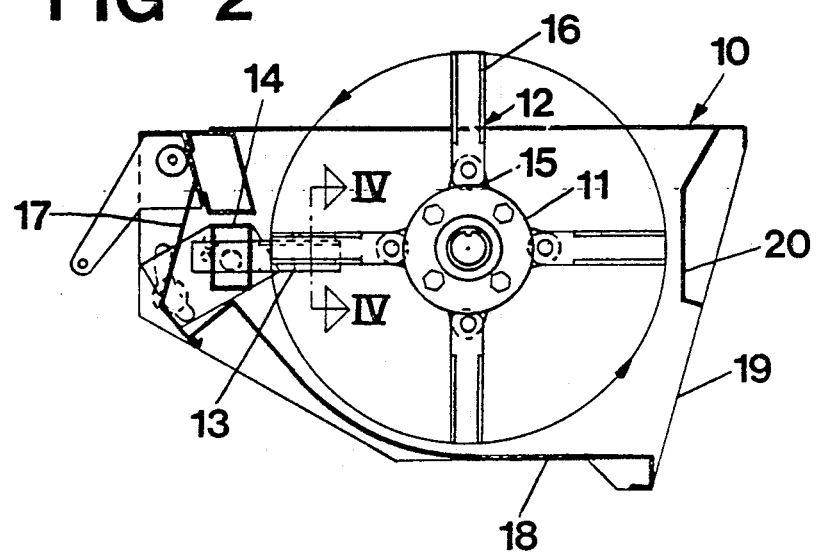
FIG. 2 is a section according to the line II—II in FIG. 1.

The straw chopper consists of an apparatus housing 10, in the gables of which a knife rotor 11 is mounted, which is provided with radially projecting knife arms 12. The knife arms 12 are pivotally mounted in pairs about the same pivot axle. The pairs of knife arms 12 attached to the rotor 11 in a staggered configuration, so that axially adjacent pairs are mounted to the rotor at angularly displaced sites to the longitudinal axis thereof. At the rotation of the rotor 11 the knife arms 12 pass between counter-knives 13, which are fixed to a knife beam 14. The knife beam 14 is adjustably attached to the apparatus housing 10, so that the length between the part of the counter knives projecting between the rotor's 11 knife arms 12 is adjustable, in order that the straw chopper can be adapted to different crops and feed. The adjustment and fixation of the knife beam 14 in different locations relative to the apparatus housing 10 is done by means of a lever (not shown).

The knife arms 12 consist of flat bars and presents along both long sides an edge 16 having a sharpening plane extending throughout the thickness of the flat bar. The edge 16 can as shown in the figures terminate just in front of the attachment to the holder 15 or extend along the whole length of the knife arm 12. The sharpening planes of the edges of the knife arms 12 can either be located on the same side surface of the flat bar, as in FIGS. 4a–e and FIGS. 5a and b or on opposite side surfaces as in FIG. 6. As the rotor 11 rotates each knife arm 12 presents one edge 16 thereof as leading edge and the opposite edge 16 as trailing edge relative to the counter-knives.

The counter-knives 13 are preferably sharpened in a corresponding way as the knife arms 12 or only along one of the long sides.

Through the single sided sharpening of the edges 16 there is obtained a longer cutting surface in comparison with a double sided sharpened edge.

The advantages which have been established after a number of practical experiments with the knife arms 12 having single bevelled edges according to the invention compared with the previously used double bevelled edges are as follows:

(a) a clear improvement of the cutting result, more precise, an increase of the decomposition of the straw and grain cross- as well as lengthwise.
(b) decreased power consumption.
(c) lowered production costs for the single sided sharpened knives.
(d) decreased wear out and tear of the edge.

A test performed by ADAS, Mechanisation Department for a manufacturer of combines and in which test a chop length analysis was made comparing four different combine mounted straw choppers gave the following result, at which chopper C refers to a chopper according to the present invention:

| Chopper | Input straw length mm | UNCHOPPED STRAW Percentage by weight | | | | CHOPPED STRAW Percentage by weight | | | |
|---|---|---|---|---|---|---|---|---|---|
| | | in each fraction | | | Median | in each fraction | | | Median |
| | | <50 mm | 50–120 mm | >120 mm | mm | <50 mm | 50–120 mm | >120 mm | mm |
| A | 446 | 15.5 | 22.2 | 62.3 | 189 | 49.9 | 40.4 | 10.1 | 50 |
| B | 502 | 9.1 | 16.7 | 74.2 | 249 | 35.6 | 41.6 | 22.8 | 74 |
| C | 492 | 9.2 | 22.9 | 67.9 | 214 | 60.9 | 32.6 | 6.5 | 41 |
| D | 506 | 4.9 | 10.7 | 84.4 | 284 | 34.9 | 37.7 | 27.4 | 78 |

An additional advantage of the single sided sharpened knife arms 12 are that they will function as fan blades and provide a directional effect to the air stream containing the chopped straw particles as they exit through the outlet 19 and are spread behind the straw cutter. The spreading direction and spreading width of the chopped straw is thus determined by the relative configuration of the sharpening planes of the knife arms 12. As the knife arms 12 are detachably attached to the rotor 11 the spreading direction and spreading width can be adjusted by changing the configuration of the sharpening planes of the knife arms 12.

Figure 4A:
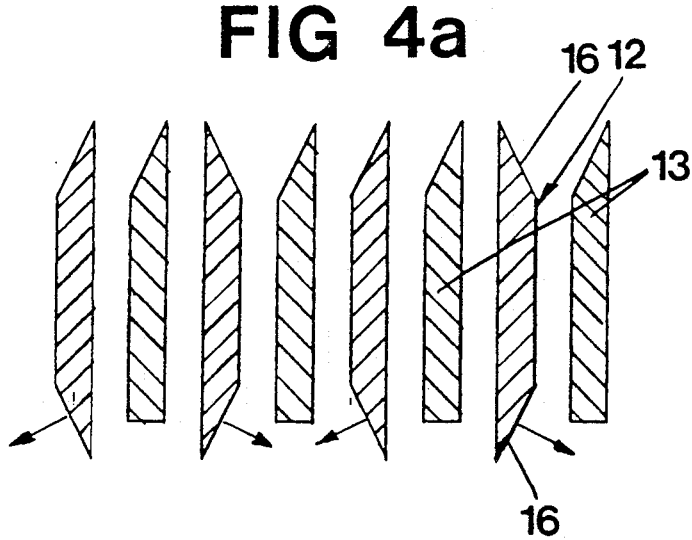
FIG. 4a–e shows schematical cross sections through the knife arms in three different mutual positions.
Figure 4B:
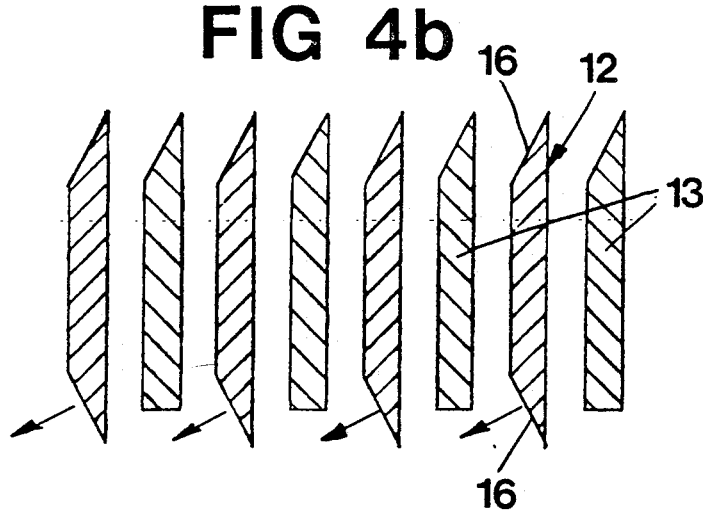
Figure 4C:
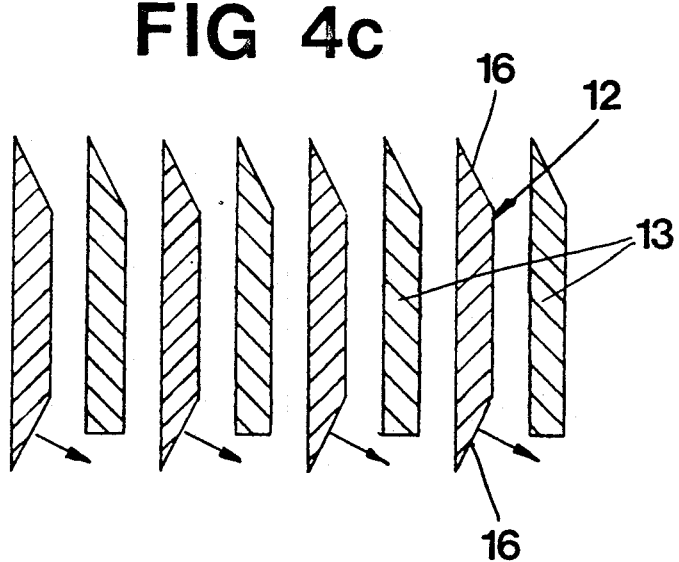
Figure 4D:
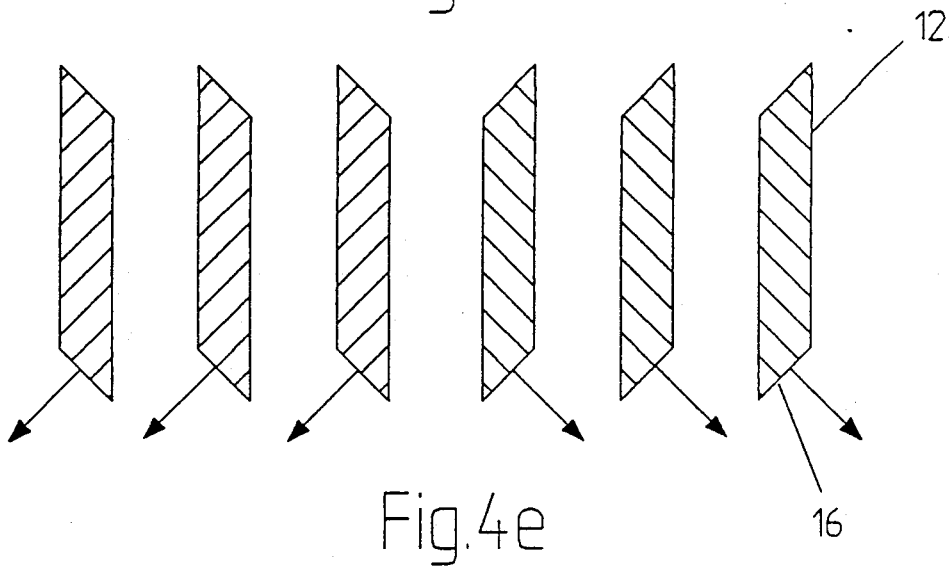
Figure 4E:
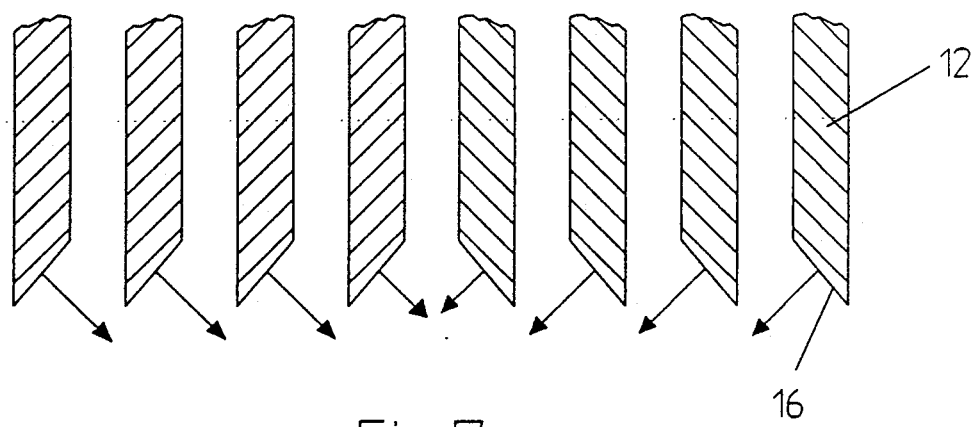

By placing the knife arms 12 as shown in FIG. 4a, i.e. every other with the sharpening plane 16 turned to the left and every other with the sharpening plane turned to the right, there is obtained a normal spreading of the chopped straw, so that the stream will be directed substantially straight backwards. By directing the sharpening planes 16 either facing to the left or to the right, as seen in FIGS. 4b and 4c, a left- respectively right- directed spreading is obtained. A broad spreading is obtained by placing a group of knife arms 12 with the sharpening planes 16 turned in the same direction and another group having their sharpening planes 16 turned in the opposite direction, at which the sharpening planes of the two groups are facing away from each other (FIG. 4d). A narrow spreading is obtained in a corresponding way by arranging the two groups of knife arms 12 with their sharpening planes 16 facing each other (FIG. 4e).

Figure 5:
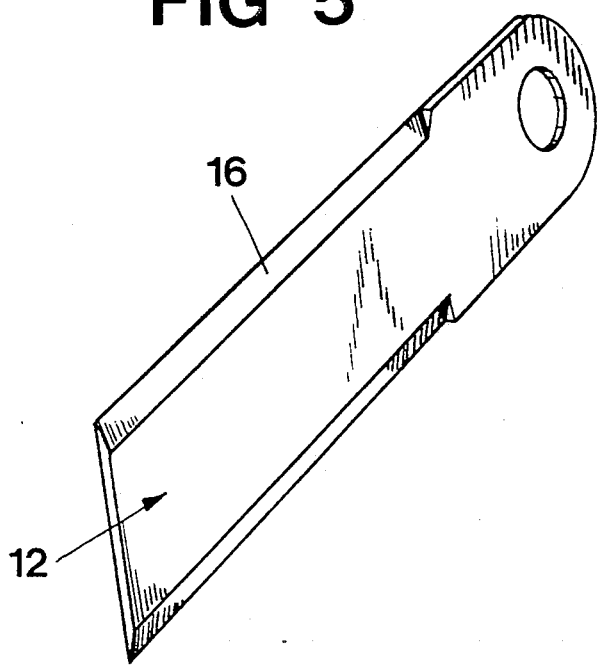
FIGS. 5 and 6 shows in perspective and cross section two different embodiments of the knife arms.
Figure 5A:
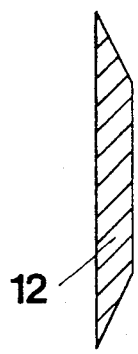
Figure 6:
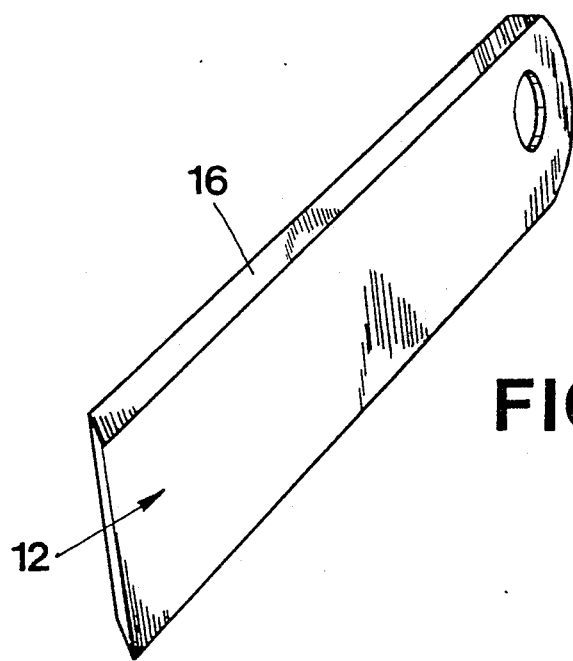
Figure 6A:
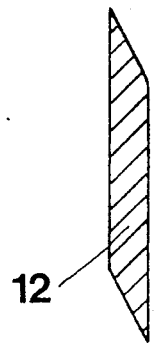

In case the two sharpening planes 16 of a knife arm 12 are facing in the same direction, as is shown in FIGS. 4 a–e and FIGS. 5 and 5A, it will direct the air stream with chopped straw in an opposite direction by detaching it from the rotor and turning it 180°, thus making the former trailing edge the leading edge.

Figure 7:
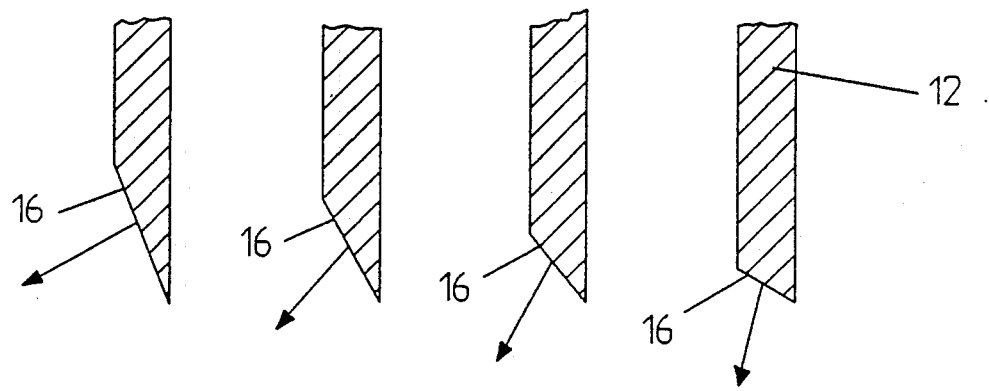
FIG. 7 illustrates the different spreading angles provided with different sharpening angles of the knife arms.

FIG. 7 illustrates that different sharpening angles of the sharpening planes 12 provides different spreading angles, thus that the spreading angle increases with an increased sharpening angle. It is in this way possible to have e.g. an increased spreading angle at the ends of the rotor 11 and a smaller spreading angle at the mid part thereof.

The apparatus housing 10 in which the rotor 11 and the knife beam 14 are placed have been given a shape to optimize the cutting result. Therefore straw and air is jointly taken in through the upper inlet of the apparatus housing and a front plate 17 prevents the air from being sucked in at the front of the apparatus housing 10. Thereby an even air stream through the apparatus housing is obtained and a whirl formation causing a stop up of the straw flow is avoided.

The bottom plate 18 is prolonged backwards so that the outgoing airstream is directed backwards before it leaves the apparatus housing 10 through the outlet 19. A rear guide plate 20 which prevents the airstream to follow the rotor 11 back, but forces it out through the outlet 19 is located above the outlet. The dispersion effect is by that improved.

The invention is certainly not limited to the shown embodiments but a number of variations are possible within the scope of the following claims.

I claim:

1. A device for chopping straw comprising:
an apparatus housing;
a rotor mounted for rotation about a longitudinal axis thereof in said apparatus housing;
said apparatus housing including opening means defining a straw inlet generally transversally towards said rotor and opening means defining a chopped straw outlet generally transversally outwards from said rotor at a site located partway circumferentially about said rotor from said straw inlet;
said apparatus housing including wall means arranged for preventing ingress of air into said housing except through said straw inlet;
a plurality of pairs of elongated knife arms, each pair being detachably mounted to said rotor so as to project generally radially therefrom, each said knife arm being generally planar and disposed to radiate from said rotor substantially transversally to said longitudinal axis;
a longitudinally extending knife beam mounted on and disposed in said apparatus housing spacedly beside said rotor radially beyond said knife arms;
a plurality of elongated counter-knives mounted in a longitudinally extending row to said knife beam so as to project therefrom towards said rotor, each said counter-knife being generally planar and disposed to project from said knife beam substantially transversally to said longitudinal axis;
said knife arms and counter-knives comprising flat bars each having two axially oppositely-facing side surfaces, and two laterally opposite long edges extending lengthwise of the respective side surfaces;
said knife arms and counter-knives being arranged so that most of them interdigitate throughout substantial portions thereof as said rotor rotates, whereby radially outer portions of most of the knife arms, upon each revolution of the rotor, pass between free end portions of a respective two of said counter-knives, so that, as said rotor rotates in one direction about said longitudinal axis, each said knife arm presents one said long edge thereof as a leading edge and another said long edge thereof as a trailing edge relative to one said long edge of said counter-knives which constitute respective leading edges of said counter-knives;
said counter-knives being arranged upstream of said chopped straw outlet, between said straw inlet and said chopped straw outlet in relation to said one direction of rotation of said rotor;

said knife arms being arranged to act as fan blades guiding the air stream with chopped straw exiting from said chopped straw outlet, by the fact that each said knife arm having said leading edge thereof in said radially outer portion thereof bevelled in a respective oblique sharpening plane which extends substantially throughout the thickness of the respective knife arm;

at which the detachable knife arms being arrangeable with their sharpening planes in different configurations with respect to each other in order to provide a desired spreading direction and spreading width of the chopped straw behind said outlet;

in each said knife arms, said oblique sharpening planes facing in the same direction, so that by turning the knife arm 180° and thereby making its former trailing edge its leading edge, its directional effect on the air stream with chopped straw is changed.

2. A device for chopping straw comprising:

an apparatus housing;

a rotor mounted for rotation about a longitudinal axis thereof in said apparatus housing;

said apparatus housing including opening means defining a straw inlet generally transversally towards said rotor and opening means defining a chopped straw outlet generally transversally outwards from said rotor at a site located partway circumferentially about said rotor from said straw inlet;

said apparatus housing including wall means arranged for preventing ingress of air into said housing except through said straw inlet;

a plurality of pairs of elongated knife arms, each pair being detachably mounted to said rotor so as to project generally radially therefrom, each said knife arm being generally planar and disposed to radiate from said rotor substantially transversally to said longitudinal axis;

a longitudinally extending knife beam mounted on and disposed in said apparatus housing spacedly beside said rotor radially beyond said knife arms;

a plurality of elongated counter-knives mounted in a longitudinally extending row to said knife beam so as to project therefrom towards said rotor, each said counter-knife being generally planar and disposed to project from said knife beam substantially transversally to said longitudinal axis;

said knife arms and counter-knives comprising flat bars each having two axially oppositely-facing side surfaces, and two laterally opposite long edges extending lengthwise of the respective side surfaces;

said knife arms and counter-knives being arranged so that most of them intermediate throughout substantial portions thereof as said rotor rotates, whereby radially outer portions of most of the knife arms, upon each revolution of the rotor, pass between free end portions of a respective two of said counter-knives, so that, as said rotor rotates in one direction about said longitudinal axis, each said knife arm presents one said long edge thereof as a leading edge and another said long edge thereof as a trailing edge relative to one said long edge of said counter-knives which constitute respective leading edges of said counter-knives;

said counter-knives being arranged upstream of said chopped straw outlet, between said straw inlet and said chopped straw outlet in relation to said one direction of rotation of said rotor;

said knife arms being arranged to act as fan blades guiding the air stream with chopped straw exiting from said chopped straw outlet, by the fact that each said knife arm having said leading edge thereof in said radially outer portion thereof bevelled in a respective oblique sharpening plane which extends substantially throughout the thickness of the respective knife arm;

at which the detachable knife arms being arrangeable with their sharpening planes in different configurations with respect to each other in order to provide a desired spreading direction and spreading width of the chopped straw behind said outlet;

said knife arms being provided with different sharpening angles from one another in order to provide different spreading angles of the chopped straw exiting from said chopped straw outlet.

3. A device for chopping straw comprising:

an apparatus housing;

a rotor mounted for rotation about a longitudinal axis thereof in said apparatus housing;

said apparatus housing including opening means defining a straw inlet generally transversally towards said rotor and opening means defining a chopped straw outlet generally transversally outwards from said rotor at a site located partway circumferentially about said rotor from said straw inlet;

said apparatus housing including wall means arranged for preventing ingress of air into said housing except through said straw inlet;

a plurality of pairs of elongated knife arms, each pair being detachably mounted to said rotor so as to project generally radially therefrom, each said knife arm being generally planar and disposed to radiate from said rotor substantially transversally to said longitudinal axis;

a longitudinally extending knife beam mounted on and disposed in said apparatus housing spacedly beside said rotor radially beyond said knife arms;

a plurality of elongated counter-knives mounted in a longitudinally extending row to said knife beam so as to project therefrom towards said rotor, each said counter-knife being generally planar and disposed to project from said knife beam substantially transversally to said longitudinal axis;

said knife arms and counter-knives comprising flat bars each having two axially oppositely-facing side surfaces, and two laterally opposite long edges extending lengthwise of the respective side surfaces;

said knife arms and counter-knives being arranged so that most of them interdigitate throughout substantial portions thereof as said rotor rotates, whereby radially outer portions of most of the knife arms, upon each revolution of the rotor, pass between free end portions of a respective two of said counter-knives, so that, as said rotor rotates in one direction about said longitudinal axis, each said knife arm presents one said long edge thereof as a leading edge and another said long edge thereof as a trailing edge relative to one said long edge of said counter-knives which constitute respective leading edges of said counter-knives;

said counter-knives being arranged upstream of said chopped straw outlet, between said straw inlet and said chopped straw outlet in relation to said one direction of rotation of said rotor;

said knife arms being arranged to act as fan blades guiding the air stream with chopped straw exiting from said chopped straw outlet, by the fact that each said knife arm having said leading edge thereof in said radially outer portion thereof bevelled in a respective oblique sharpening plane which extends substantially throughout the thickness of the respective knife arm;

at which the detachable knife arms being arrangeable with their sharpening planes in different configurations with respect to each other in order to provide a desired spreading direction and spreading width of the chopped straw behind said outlet;

said apparatus housing including guide plate wall means arranged downstream of said outlet, between said chopped straw outlet and said inlet, for tending to force air which has entered said apparatus housing with straw through said straw inlet from remaining in said apparatus housing downstream of said chopped straw outlet and for tending to force such air to exit from said apparatus with chopped straw through said chopped straw outlet.

4. The straw chopping device of claim 3, wherein:
said apparatus housing includes wall means arranged for preventing ingress of air into said housing except through said straw inlet.

5. A device for chopping straw comprising:
an apparatus housing;
a rotor mounted for rotation about a longitudinal axis thereof in said apparatus housing;
said apparatus housing including opening means defining a straw inlet generally transversally towards said rotor and opening means defining a chopped straw outlet generally transversally outwards from said rotor at a site located part-way circumferentially about said rotor from said straw inlet;
said apparatus housing including wall means arranged for preventing ingress of air into said housing except through said straw inlet;
said apparatus housing including guide plate wall means arranged downstream of said outlet, between said chopped straw outlet and said inlet, for tending to force air which has entered said apparatus housing with straw through said straw inlet from remaining in said apparatus housing downstream of said chopped straw outlet and for tending to force such air to exit from said apparatus with chopped straw through said chopped straw outlet;
a plurality of pairs of elongated knife arms, each pair being detachably mounted to said rotor so as to project generally radially therefrom, each said knife arm being generally planar and disposed to radiate from said rotor substantially transversally to said longitudinal axis;
a longitudinally extending knife beam mounted on and disposed in said apparatus housing spacedly beside said rotor radially beyond said knife arms;
a plurality of elongated counter-knives mounted in a longitudinally extending row to said knife beam so as to project therefrom towards said rotor, each said counter-knife being generally planar and disposed to project from said knife beam substantially transversally to said longitudinal axis;
said knife arms and counter-knives comprising flat bars each having two axially oppositely-facing side surfaces, and two laterally opposite long edges extending lengthwise of the respective side surfaces;
said knife arms and counter-knives being arranged so that most of them interdigitate throughout substantial portions thereof as said rotor rotates, whereby radially outer portions of most of the knife arms, upon each revolution of the rotor, pass between free end portions of a respective two of said counter-knives, so that, as said rotor rotates in one direction about said longitudinal axis, each said knife arm presents one said long edge thereof as a leading edge and another said long edge thereof as a trailing edge relative to one said long edge of said counter-knives which constitute respective leading edges of said counter-knives;
said counter-knives being arranged upstream of said chopped straw outlet, between said straw inlet and said chopped straw outlet in relation to said one direction of rotation of said rotor;
said knife arms being arranged to act as fan blades guiding the air stream with chopped straw exiting from said chopped straw outlet, by each said knife arm having said leading edge thereof in said radially outer portion thereof bevelled in a respective oblique sharpening plane which extends substantially throughout the thickness of the respective knife arm;
the detachable knife arms being arrangeable with their sharpening planes in different configurations with respect to each other in order to provide a desired spreading direction and spreading width of the chopped straw behind said outlet; and
on each said knife arm, said oblique sharpening planes face in the same direction, so that by turning the knife arm 180° and thereby making its former trailing edge its leading edge, its directional effect on the air stream with chopped straw is changed.

* * * * *